F. C. MOSIER.
TRANSPLANTING BOX.
APPLICATION FILED JUNE 20, 1914.
1,115,089. Patented Oct. 27, 1914.
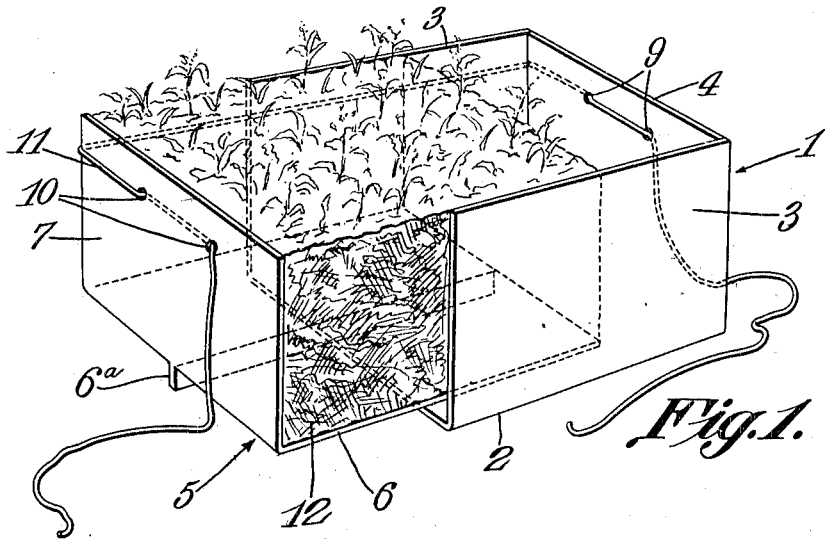
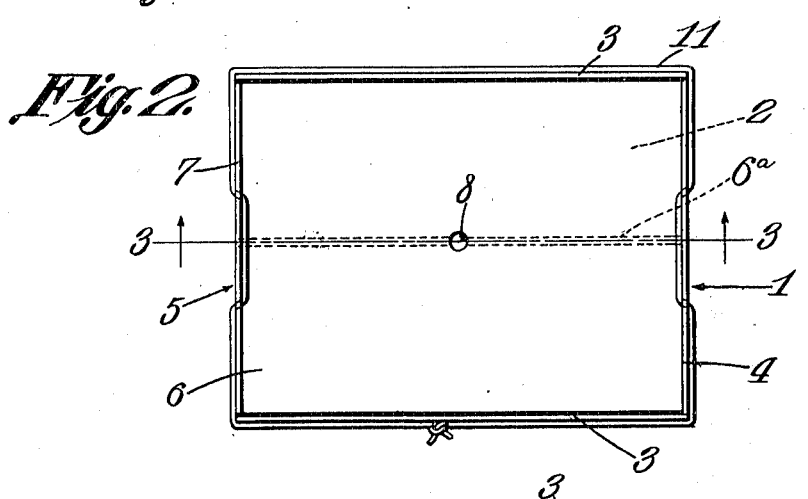
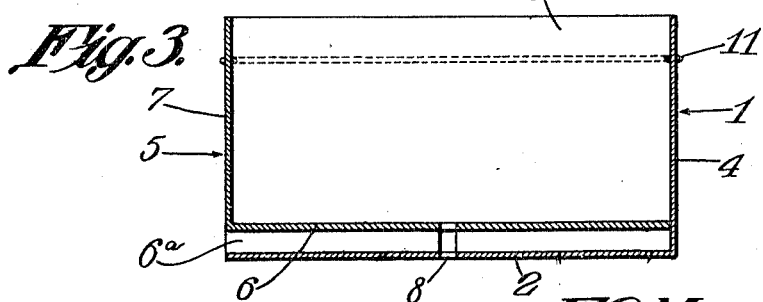
Witnesses
F. C. Mosier, Inventor
by C. A. Snow & Co.
Attorneys

UNITED STATES PATENT OFFICE.

FRANK C. MOSIER, OF PITTSTON, PENNSYLVANIA.

TRANSPLANTING-BOX.

1,115,089.  Specification of Letters Patent.  Patented Oct. 27, 1914.

Application filed June 20, 1914. Serial No. 846,343.

*To all whom it may concern:*

Be it known that I, FRANK C. MOSIER, a citizen of the United States, residing at Pittston, in the county of Luzerne and State of Pennsylvania, have invented a new and useful Transplanting-Box, of which the following is a specification.

The present invention appertains to transplanters, and aims to provide a novel and improved transplanting device for horticultural purposes.

The present invention contemplates the provision of a unique transplanting device, of simple, and inexpensive construction, which may be readily and effectively employed for propagating plants in hot-houses or indoors, and for enabling the plants to be transplanted out of doors, after they have been started, and when the weather permits.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its perferred embodiment in the accompanying drawing, wherein—

Figure 1 is a perspective view of the improved transplanting device, illustrating the scoop or removable member partially removed. Fig. 2 is a plan view of the transplanting device in normal condition. Fig. 3 is a vertical section of the device taken on the line 3—3 of Fig. 2.

The present device embodies a receptacle or container including a box proper 1, which may be constructed of wood, sheet metal, glass, paper, clay, or any other suitable material. As illustrated, the box 1 is formed from a blank of sheet metal, and includes the bottom 2 having the upturned walls 3 at opposite sides, and upturned side wall 4 between certain ends of the side walls 3. The other side, or that side opposite the side wall 4, is open.

The device further includes a scoop or removable member 5, which comprises the bottom 6 of sheet metal or any other suitable material, having an upturned end piece 7 at its outer end. The bottom 6 of the scoop is of a size similar to the bottom 2 of the box, and is spaced slightly thereabove by a central longitudinal depending flange 6ª seating on the bottom 2, the scoop bottom 6 fits snugly between the sides 3 of the box, whereby the end piece 7 of the scoop fits within and closes the open side of the box and completes the receptacle or container.

The bottom 6 of the scoop 5 is preferably provided with a central drain aperture 8 as well as the bottom 2 of the box to enable the excessive water to be discharged from the container or receptacle.

As a means for normally holding the scoop 5 within the box 1, the side wall or end 4 of the box 1 is provided with a pair of apertures 9 adjacent its upper edge, and the end piece 7 of the scoop is provided with a similar pair of apertures 10, adjacent its upper edge. A wire, cord or flexible binding element 11 embraces the box and scoop and is threaded through the apertures 9 and 10, so that when the ends or terminals of the flexible element 11 are tied or knotted together, as seen in Fig. 2, the said element will tightly embrace the side walls of the box and scoop, to hold the scoop at normal position, and will also prevent the side walls of the receptacle or container from bulging or flexing outwardly under the pressure of the loam or soil 12 therein. Thus, when the scoop 5 is in place within the box 1, and when the flexible binding element 11 is drawn taut and tied, the receptacle or container will be in condition to receive the loam or soil 12, for propagating or rearing the plants within a hot-house or indoors. The binding element 11 will not only hold the scoop firmly in place, but will also prevent the side walls of the container or receptacle from being bulged or bent outwardly. The transplanting device may then be disposed within a hot-house or indoors, where the atmospheric conditions are favorable, and in order that the plants may be given an early start, while the external atmospheric conditions are unfavorable or when frosts are liable to occur. As soon as the weather permits, the plants may be transplanted out of doors, in the yard, garden, farm or the like, whereby the plants may continue to grow without any check in the growing thereof.

To transplant the plants, the flexible binding element 11 is loosened or opened, as seen in Fig. 1, and the scoop 5 is withdrawn from the box 1, and will carry with it, the loam or soil 12 which is disposed upon the bottom 6 of the scoop. The loam or soil 12 may then be readily carried by the scoop 5, and slipped off of the same into a hole provided in the soil of the garden, or the like. The sides of the scoop 5 being open, will enable the loam 12 to be readily slid off of the bottom of the scoop, when the loam or soil 12 is being deposited or transplanted in the garden or final bed for the plants.

The present invention thus enables the plants to be reared or cultivated early in the season, within a hot-house, or the like, in order that the plants may be given an early start, and as soon as the weather permits, the plants may be quickly transplanted out of doors, to insure the early maturing of the plants or vegetation for the market, and at a considerable period before those plants will mature which have been started out of doors.

The present device is an extremely simple and inexpensive one, and may be employed from season to season.

The device may also be constructed in various sizes, acording to the circumstances.

The depending flange 6ª of the scoop bottom is of advantage, inasmuch as it spaces the scoop above the bottom of the box, which is in itself of advantage, and which is further of advantage in that it enables the scoop to be readily withdrawn from the box without the liability of the scoop sticking or clinging to the box after the loam has been in the receptacle or container for some time. The flange 6ª therefore enables the scoop to be handled more conveniently, it being noted that when the end piece 7 of the scoop is withdrawn from the box, the scoop may be tilted laterally upon the flange 6ª as a fulcrum to loosen the loam from the walls of the box.

Having thus described the invention, what is claimed as new is:—

1. A transplanting device including a box having one side open, a removable scoop disposed over the bottom of the box and normally closing the said open side, and a binding element embracing and threaded through certain portions of the box and scoop.

2. A transplanting device including a box having one side open, a removable scoop including a bottom disposed over the bottom of the box and fitting snugly within the sides thereof and an end piece upstanding from one end of the scoop bottom and normally closing the open side of the box, and a binding element embracing the box and scoop, and threaded through the said end piece of the scoop and the opposite side of the box.

3. A transplanting device including a box having one side open, and a removable scoop disposed over the bottom of the box and fitting snugly within the sides, and including an end piece upstanding from one end of the scoop bottom and normally fitting within and closing the said open side of the box, the scoop bottom having a central longitudinal depending flange for spacing it above the bottom of the box and upon which the scoop is tiltable when the end piece thereof is withdrawn from the box.

In testimony that I claim the foregoing as my own, I have hereto affixed my signature in the presence of two witnesses.

FRANK C. MOSIER.

Witnesses:
   MORGAN L. PERRIN,
   JOHN T. FLANNERY.